United States Patent
Espelien

(10) Patent No.: US 7,900,818 B2
(45) Date of Patent: Mar. 8, 2011

(54) SYSTEM AND METHOD FOR ACCESSING ELECTRONIC PROGRAM GUIDE INFORMATION AND MEDIA CONTENT FROM MULTIPLE LOCATIONS USING MOBILE DEVICES

(75) Inventor: Joel Espelien, San Diego, CA (US)

(73) Assignee: PacketVideo Corp., San Diego, CA (US)

( * ) Notice: Subject to any disclaimer, the term of this patent is extended or adjusted under 35 U.S.C. 154(b) by 1173 days.

(21) Appl. No.: 11/581,306

(22) Filed: Oct. 16, 2006

(65) Prior Publication Data

US 2007/0112935 A1     May 17, 2007

Related U.S. Application Data

(60) Provisional application No. 60/736,410, filed on Nov. 14, 2005.

(51) Int. Cl.
*G06F 17/00* (2006.01)
(52) U.S. Cl. .......................... 235/375; 235/377
(58) Field of Classification Search .................... 725/22, 725/25, 27, 39, 49, 50, 54, 61, 81, 86, 91; 235/375, 377
See application file for complete search history.

(56) References Cited

U.S. PATENT DOCUMENTS

| | | | |
|---|---|---|---|
| 6,108,365 A * | 8/2000 | Rubin et al. ..................... 725/25 |
| 6,167,092 A | 12/2000 | Lengwehasatit | |
| 6,498,865 B1 | 12/2002 | Brailean et al. | |
| 6,529,552 B1 | 3/2003 | Tsai et al. | |
| 6,804,717 B1 | 10/2004 | Bakshi et al. | |
| 7,006,631 B1 | 2/2006 | Luttrell | |
| 7,139,279 B2 | 11/2006 | Jabri et al. | |
| 2003/0067872 A1 | 4/2003 | Harrell et al. | |
| 2003/0093267 A1 | 5/2003 | Leichtling et al. | |
| 2003/0110503 A1 * | 6/2003 | Perkes ........................... 725/86 |
| 2003/0142744 A1 | 7/2003 | Wu et al. | |
| 2004/0015989 A1 * | 1/2004 | Kaizu et al. ..................... 725/39 |
| 2004/0158645 A1 | 8/2004 | Morinaga et al. | |
| 2004/0174817 A1 | 9/2004 | Jabri et al. | |
| 2004/0193762 A1 | 9/2004 | Leon et al. | |
| 2004/0218673 A1 | 11/2004 | Wang et al. | |
| 2005/0008030 A1 | 1/2005 | Hoffmann et al. | |
| 2006/0013148 A1 | 1/2006 | Burman et al. | |
| 2006/0029041 A1 | 2/2006 | Jabri et al. | |
| 2006/0056416 A1 | 3/2006 | Yang et al. | |
| 2006/0159037 A1 | 7/2006 | Jabri et al. | |

(Continued)

*Primary Examiner* — Thien M Le
(74) *Attorney, Agent, or Firm* — Patents +TMS, P.C.

(57) ABSTRACT

A system and a method for accessing an electronic program guide (EPG) and media content from multiple locations using mobile devices. The media content is available from a content provider via a first network. The system and the method have a first terminal that may be located in a first location or in a second location. The terminal displays, accesses and/or connects to EPG for identifying and/or for accessing the media content. The first location or the second location of the first terminal is identified and/or is determined by the EPG and/or a second terminal in communication with the first terminal and/or the EPG. The first terminal accesses the EPG to identify a first list of media content or a second list of media content which may be consumed by the first terminal in the first location or the second location, respectively. The media content is restricted and/or is supplemented based on the first location or the second location of the first terminal. The first terminal consumes media content from the first list or the second list of media content in the first location or the second location, respectively.

40 Claims, 2 Drawing Sheets

U.S. PATENT DOCUMENTS

| | | |
|---|---|---|
| 2006/0176877 A1 | 8/2006 | Jabri et al. |
| 2007/0011277 A1 | 1/2007 | Neff et al. |
| 2007/0061363 A1* | 3/2007 | Ramer et al. ............... 707/104.1 |
| 2007/0076756 A1 | 4/2007 | Chan et al. |
| 2007/0156770 A1 | 7/2007 | Espelien |
| 2007/0186003 A1 | 8/2007 | Foster et al. |
| 2007/0189275 A1 | 8/2007 | Neff |
| 2007/0220555 A1 | 9/2007 | Espelien |
| 2007/0226315 A1 | 9/2007 | Espelien |
| 2007/0233701 A1 | 10/2007 | Sherwood et al. |
| 2007/0245399 A1 | 10/2007 | Espelien |

* cited by examiner

SYSTEM AND METHOD FOR ACCESSING ELECTRONIC PROGRAM GUIDE INFORMATION AND MEDIA CONTENT FROM MULTIPLE LOCATIONS USING MOBILE DEVICES

This application claims the benefit of U.S. Provisional Application Ser. No. 60/736,410, filed Nov. 14, 2005.

BACKGROUND OF THE INVENTION

The present invention generally relates to a system and a method for accessing electronic program guide (hereinafter "EPG") information and media content from multiple locations using mobile devices. More specifically, the present invention relates to a system and a method for accessing EPG information and multimedia and/or media content from a database of a content provider via one or more terminals in one or more locations. Using location information, a first terminal may display a first EPG having a first list of media content or a second list of media content which may be accessed by the first terminal in a first location or a second location, respectively. A first user may access the first EPG via the first terminal to identify, to access, to receive and/or to consume a first multimedia file from the first list of media content or the second list of media content based on the first location or the second location, respectively. A second user may access a second EPG via a second terminal to identify, to access, to receive and/or to consume a second multimedia file from the first list of media content or the second list of media content based on a first location or a second location, respectively, of the second terminal.

It is generally known, for example, that a user displays, accesses, obtains and/or views an EPG via a terminal over a network. The EPG displays, identifies and/or provides a list in a text form or a graphical form of multimedia available and/or accessible from a content provider. The EPG has a set of displays and/or a set of screens which may be layered, may be composited and/or may be combined with the multimedia content itself. Typically, the content provider is, for example, a cable television or a satellite television station. Further, the terminal is, traditionally, a set-top receiver which is in communication with the content provider and/or is connected to an output means, such as, for example, a display, a television, a monitor and/or the like. As a result, the location of the terminal is stationary with respect to the content provider. The EPG provided by and/or available from the content provider corresponds to a fixed location of the terminal and does not include EPG information corresponding to more than one terminal location. Further, the EPG only displays and/or only identifies the list of multimedia which corresponds to the location of the terminal. As a result, the user is incapable of accessing, of identifying and/or of obtaining the EGP information about multimedia content available and/or accessible from the content provider in other locations remote with respect to the location of the terminal.

It is also known that EPG information about multimedia content from one or more content providers is displayed, is identified and/or is accessible via a website over a network, such as, for example, the internet via a personal computer connected to an output means. A user of the terminal may view, access and/or identify a list of multimedia offered by the content provider which corresponds to a location based on entering a zip code or address information into the website. As a result, the user may identify, may access and/or may view lists of multimedia available by and/or accessible from the content provider at more than one location via the website and/or the network.

However, the EPG which are accessible via a website over the network is a static list of media content that does not provide access to the media content itself. This is similar to traditional newspaper or magazine listings of media content. The user must first identify media content in the list of multimedia via the website and/or the network. Then, the user must relocate, identify and access the desired media content from another EPG associated with a viewing terminal and/or the output means, such as, for example, a television in order to consume the multimedia content. The Internet EPG is not associated with, is not connected to and/or is not in communication with the EPG of the viewing terminal and/or the output means. Further, the EPG of the viewing terminal and/or the output means is only associated with, only corresponds to and/or is only based on a fixed location of the viewing terminal. The user is incapable of accessing, of receiving and/or of consuming the media content displayed in lists of multimedia offered in locations remote from the location of the viewing terminal. As a result, the user identifies the media content available from the content provider in locations remote with respect to the viewing terminal via the website without being capable of accessing, of viewing and/or of consuming that media content accessible in locations remote with respect to the viewing terminal.

Finally, it is known that a content provider may wish to restrict access to particular content from particular locations based on restriction factors. For example, a sports league may enter into business relationships with television stations which provide for a particular event to not be broadcasted live on television within a geographic area to encourage consumers to buy tickets and see the game in person. As a result, the multimedia content associated with the game may be simply removed from the EPG for users within the geographic area. A user of the EPG of the viewing terminal is incapable of identifying and/or determining, for example, that the multimedia content of the game has been removed from the EPG, why the multimedia content of the game was removed from the EPG, where the multimedia content of the game may be accessed and/or may be viewed and/or whether the multimedia of the game is available in another format, such as, for example, an audio broadcast on radio.

A need, therefore, exists for a system and a method for accessing EPG information and media content from multiple locations using mobile devices. The EPG and/or media content accessible may be based on the location of each mobile device. Further, a need exists for a system and a method for accessing EPG information and media content from multiple locations using mobile devices which changes the EPG information and/or multimedia content available based on a location of a viewing terminal and/or a user. Still further, a need exists for a system and a method for accessing EPG information and media content from multiple locations using mobile devices which provides metadata and/or information associated with an item of multimedia content based on a location of a viewing terminal and/or a user. Moreover, a need exists for a system and a method for accessing EPG information and media content from multiple locations using mobile devices which provides the EPG information to the user to display availability of multimedia content based on a location of and/or a format capability of a viewing terminal.

SUMMARY OF THE INVENTION

The present invention generally relates to a system and a method for accessing electronic program guide (EPG) information and media content from multiple locations using mobile devices. A first terminal in a first location may access and/or may identify a first EPG containing a first list of media content available in the first location by a content provider. The first EPG having a first list of media content may contain one or more items which may be associated with, may be affected by and/or may correspond to the first location. After moving to a second location, the first terminal may access and/or may identify a second EPG containing a second list of media content which may contain one or more items which may be associated with, may be affected by and/or may correspond to the second location. The first terminal may move from the first location to the second location to access, to receive and/or to consume a first media content or a second media content which may be selected from the first list or the second list, respectively, via the first EPG or the second EPG, respectively. The first EPG and/or the second EPG may contain metadata and/or information associated with and/or corresponding to one or more content items in the first and/or the second list, respectively, based on the first location and/or the second location. A second terminal in a third location may access, may receive and/or may consume a second media content from a third EPG having a third list of media content from one or more content providers. The second terminal in the first location or the second location may identify and/or may use the third EPG to access and/or to consume the second media content from the third list.

In an embodiment of the present invention, a system for accessing media content is provided. The system has digital media having a first digital media file and a second digital media file wherein the first digital media file has first metadata corresponding to a first location wherein the second digital media file has second metadata corresponding to a second location wherein the second location is remote with respect to the first location. Further, the system has a server storing the digital media wherein the server stores a first list of digital media and a second list of digital media wherein the first list of digital media indicates that the first digital media file is accessible at the first location wherein the second list of digital media indicates that the second digital media file is accessible at the second location. Still further, the system has a first terminal electrically connected to the server via a communication network wherein the first terminal accesses and communicates with the server via the communication network wherein the first terminal is movable between the first location and the second location. Moreover, the system has a locating device electrically connected to the server wherein the server determines whether the first terminal is positioned at the first location or the second location via the locating device wherein the server transmits the first list of digital media to the first terminal which is located at the first location wherein the server transmits the second list of digital media to the first terminal which is located at the second location wherein the first terminal accesses the first digital media file from the server via the first list of digital media wherein the first terminal accesses the second digital media file from the server via the second list of digital media.

In an embodiment, the system has the communication network is a wireless network.

In an embodiment, the system has a second terminal positioned in a third location wherein the second terminal is electrically connected to the first terminal.

In an embodiment, the system has an electronic program guide accessible from the server by the first terminal wherein the first terminal displays the first list of digital media via electronic program guide.

In another embodiment of the present invention, a method for accessing electronic program guide information and media content from multiple locations is provided. The method has the step of providing a first terminal having database wherein the first terminal stores multimedia having a first digital media file and a second digital media file wherein the first digital media file is encoded in a first format and a second format wherein the first format is a different format than the second format wherein the first digital media file encoded in the first format and the second digital media file have first metadata corresponding to a first location wherein the first digital media file encoded in the second format has second metadata corresponding to a second location. Additionally, the method has the step of connecting a second terminal to the first terminal via a communication network wherein the second terminal is in communication with the first terminal via the communication network wherein the second terminal is positioned in a third location with respect to the first terminal. Further, the method has the step of transmitting location information to the first server wherein the location information identifies the third location of the second terminal wherein the first terminal compares the third location of the second terminal to the first location corresponding to the first metadata and the second location corresponding to the second metadata. Still further, the method has the step of determining available media which is accessible by the second terminal positioned in the third location wherein the first metadata corresponds to the third location of the second terminal wherein the available media is the first digital media file encoded in the first format and the second digital media file. Moreover, the method has the step of displaying a list of the available media via the second terminal wherein the list identifies the first digital media file encoded in the first format and the second digital file as the available media which is accessible by the second terminal in the third location.

In an embodiment, the method has the step of inputting the location information into the second terminal wherein the second terminal transmits the location information to the first terminal via the communication network.

In an embodiment, the method has the step of connecting a third terminal to the second terminal wherein the second terminal transmits the list of available media to the third terminal.

In an embodiment, the communication network is wireless.

In an embodiment, the method has the step of displaying an electronic program guide on the second terminal wherein the list of available media is identified via electronic program guide.

In an embodiment, the method has the step of accessing the available media wherein the available media is transmitted from the first terminal to the second server via the communication network.

In an embodiment, the method has the step of positioning the second terminal adjacent to the second location wherein the first digital media file encoded in the second format is accessed by the second terminal in the forth location.

In an embodiment, the method has the step of receiving the available media from the first terminal via the communication network wherein the second terminal consumes the available media.

In an embodiment, the method has the step of switching from transmitting the first digital media file encoded in the first format to transmitting the first digital media file encoded in the second format.

In an embodiment of the present invention, a method for accessing electronic program guide information and media content from multiple locations is provided. The method has the step of storing first available digital media and second available digital media in a database connected to a first terminal wherein the first available digital media has first metadata which identifies a first location and the second available digital media has second metadata which identifies a second location wherein the second available digital media is encoded in a first format. Additionally, the method has the step of transmitting location information of a second terminal to the first terminal wherein the first terminal determines whether the second terminal is located within the first location or the second location wherein the second terminal is electrically connected to the first terminal via a communication network wherein the second terminal accesses and communicates with the first terminal via the communication network. Further, the method has the step of determining that the second terminal is located within the first location via the location information wherein the first terminal identifies that first available digital media corresponds to the first location via the first metadata of the first available digital media. Moreover, the method has the step of displaying a first electronic program guide via the second terminal wherein the first electronic program guide is transmitted from the first terminal to the second terminal via the communication network wherein the first electronic program guide identifies the first available digital media which is consumable by the second terminal located within the first location.

In an embodiment, the method has the step of transmitting a digital media file from the first terminal to the second terminal via the communication network wherein the digital media file is selected from first available digital media via the first electronic program guide.

In an embodiment, the method has the step of accessing the first metadata of the first available digital media with the second terminal via the first electronic program guide.

In an embodiment, the method has the step of identifying the second available digital media which is unavailable to the second terminal located within the first location.

In an embodiment, the method has the step of encoding the second available digital media in a second format wherein the second available digital media encoded in the second format is accessible by the second terminal located within the first area.

In an embodiment, the method has the step of positioning the second terminal within the second location wherein the second available digital is accessible by the second terminal.

In an embodiment, the method has the step of transmitting a second electronic program guide from the first server to the second server via the communication network wherein the second electronic program guide identifies the second available digital media.

It is, therefore, an advantage of the present invention to provide a system and a method for accessing EPG information and media content from multiple locations using mobile devices which may based on and/or may correspond to a one or more locations.

A further advantage of the present invention is to provide a system and a method for accessing EPG information and media content from multiple locations using mobile devices which may provide a first list of media content or a second list of media content associated with and/or available to a terminal and/or a user located in a first location and/or a second location, respectively.

Moreover, an advantage of the present invention is to provide a system and a method for accessing EPG information and media content from multiple locations using mobile devices which may identify, may transmit and/or may receive a location of a terminal over a wireless network.

Yet another advantage of the present invention is to provide a system and a method for accessing EPG information and media content from multiple locations using mobile devices which may provide a EPG for communication between a content provider, a first terminal and/or a second terminal.

Another advantage of the present invention is to provide a system and a method for accessing EPG information and media content from multiple locations using mobile devices which may provide access to media content available from a content provider based on a location of a terminal and/or a time of receiving the media content.

Yet another advantage of the present invention is to provide a system and a method for accessing EPG information and media content from multiple locations using mobile devices which may provide metadata associated with the media content based on a location of a terminal for receiving the media content.

Moreover, an advantage of the present invention is to provide a system and a method for accessing EPG information and media content from multiple locations using mobile devices which may display one or more formats of the media content available by a content provider based on a location of a terminal.

And, another advantage of the present invention is to provide a system and a method for accessing EPG information and media content from multiple locations using mobile devices which may switch from a first format to a second format of the media content consumed by a terminal based on a movement of the terminal from a first location to a second location.

Yet another advantage of the present invention is to provide a system and a method for accessing EPG information and media content from multiple locations using mobile devices which may identify media content not available to a terminal based on a location of the terminal.

Moreover, an advantage of the present invention is to provide a system and a method for accessing EPG information and media content from multiple locations using mobile devices which may provide local media content and/or regional media content based on a location of a terminal at a time of receiving the media content.

Additional features and advantages of the present invention are described in, and will be apparent from, the detailed description of the presently preferred embodiments and from the drawings.

DETAILED DESCRIPTION OF THE PREFERRED EMBODIMENTS

The present invention relates to a system and a method for accessing electronic program guide (EPG) information and media content from multiple locations using mobile devices. The system and the method may have a first terminal in a first location or in a second location. The first terminal may move from the first location to the second location. The first terminal may use a first EPG to identify a first list of media content or a second list of media content which may be consumed by the first terminal in the first location or the second location, respectively. The first terminal may identify and consume a first media content from the first EPG containing the first list or the second list of media content. The second terminal may use a second EPG to identify and consume a second media content from the first list, the second list and/or a third list of media content based on the second terminal moving between the first location, the second location and/or a third location, respectively.

Figure 1:
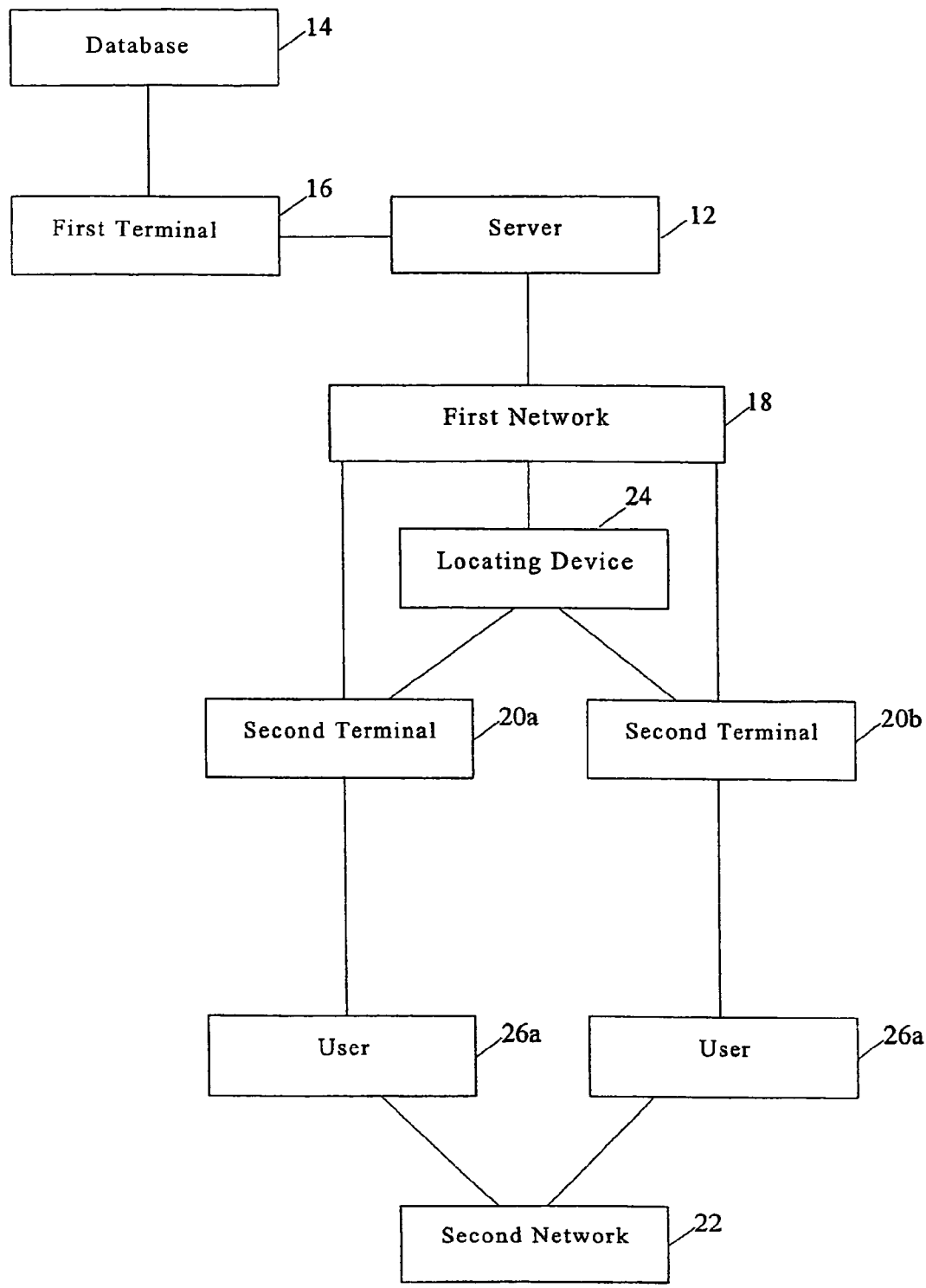
FIG. 1 illustrates a black box diagram of a system for accessing EPG information and media content from multiple locations using mobile devices in an embodiment of the present invention.

Referring now to the drawings wherein like numerals refer to like parts, FIG. 1 illustrates a system 10 which may have a server 12 for connecting a database 14 of a first terminal 16 to a first data communication network 18 (hereinafter "the first network 18"). The database 14 may be connected to and/or may be in communication with the server 12. The database 14 of the first terminal 16 may be accessible by the first terminal 16, the server 12 and/or the first network 18. The first terminal 16 may be local and/or may be remote with respect to the server 12 and/or the database 14. The database 14 may be local or may be remote from the server 12. The first terminal 16 may be, for example, a media content provider terminal, a media content service terminal, a media store terminal and/or the like. The present invention should not be limited to a specific embodiment of the first terminal 16. It should be understood that the first terminal 16 may be any media provider end point as known to one of ordinary skill in the art.

The database 14 may have, may contain and/or may store multimedia and/or data. The multimedia may be digital media files, such as, for example, audio signals, video frames, data feeds, data streams, musical compositions, radio programs, audio books, audio programs, television programs, audio or video commercials or advertisements, satellite television programs, public access programs, movies, music videos; animated works, video programs, video games and/or soundtracks and/or video tracks of audiovisual works, dramatic works, film scores and/or an operas and/or the like. Further, the data may be based on, may correspond to and/or may be associated with the digital media files. The present invention should not be limited to a specific embodiment of the data and/or the digital media files. It should be understood that the data and/or the digital media files may be any data and/or any digital media file, respectively, as known to one of ordinary skill in the art.

Each digital media file which may be stored in the database 14 may have, for example, metadata. The metadata may be, for example, a communication and/or information which may be associated with, may relate to and/or may correspond to a digital media file and/or the first terminal 16. The communication may be, for example, text, a graphic, a voice recording, a video recording, a conferencing recording, a comment, a note, a review, a correspondence, a commentary, a message, a discussion, a notice, a bulletin, a memorandum, news and/or the like which may be related to, may be associated with and/or may be based on the multimedia and/or the digital media file.

The information may be, for example, a name of the digital media file, a type of digital media file and/or the like. The type of digital media file may be, for example, a musical composition, a radio program, an audio book, an audio program, a television program, a commercial or other advertisement, a movie, a music video, an animated work, a video program, a video game and/or a soundtrack and/or a video track of an audiovisual work, a dramatic work, a film score and/or an opera and/or the like. Further, the information may have limitations to availability and/or consumption of the multimedia and/or the digital media file. The limitations may be based on and/or may correspond to geographical boundaries, licensing rights, distribution regulations or public laws or regulations. The information and/or the limitations may identify permitted locations and/or permitted times for transmitting, for receiving, for consuming and/or for viewing the multimedia and/or the digital media file.

Still further, the information may be, for example, a year of the digital media file, an artist associated with the digital media file, a publisher or a copyright owner of the digital media file, a genre associated with the digital media file and/or a length of time of the digital media file. Moreover, the information may be, for example, a content rating of the digital media file, a language associated with the digital media file, a key word associated with the digital media file, a review of the digital media file, a source of the digital media file and/or the like. The present invention should not be limited to a specific embodiment of the communication, the information and/or the limitations of the metadata. It should be understood that the communication, the information and/or the limitations may be any communication, information and/or any limitations, respectively, as known to one of ordinary skill in the art.

The first terminal 16 and/or the database 14 may have an EPG and/or EPG information. The EPG may have a list of multimedia items, an interactive application for identifying multimedia items by, for example, a hierarchical category, a user search criteria and/or the like. The EPG may search, may organize, may locate, may identify, may recommend, may navigate and/or may select the multimedia, the digital media files and/or the metadata stored in the database 14. The EPG may have a graphical user interface (hereinafter "GUI") for displaying availability information corresponding to and/or based on the multimedia, the digital media files and/or the metadata. The availability information may display the permitted times of, the permitted locations of, the permitted formats, and/or available sources of the multimedia and/or the digital media files. Information about the multimedia and/or the digital media files which may be available from the first terminal 16 may be identified and/or may be displayed by the EPG using the GUI. The GUI may display the availability information in a display format, such as, for example, rows and/or columns. Alternatively, the GUI may display information based on graphical icons representing content elements, based on a hierarchical display, or based on displaying a single set of preferred responses based on search criteria entered by the user. Further, the GUI may display the availability information in two dimensions or three dimensions. The GUI may be presented as a persistent element of a display screen or may be presented as an overlay, a transparency, a pop-up display, a ticker-tape scroll bar, a picture-in-picture display and/or the like. Presentation of the GUI may allow the user to see the availability information while continuing to view the multimedia content. Further, the GUI may be formatted, may be displayed and/or rendered in a standard format, such as, for example, XML, RDF, RSS, MathML, XHTML, SVG, Flash, SMIL, LASER, cXML and/or the like. It should be understood that the EPG, the display format of the GUI and/or the standard data format of the GUI may be any guide application, any display format and/or any standard data format, respectively, as known to one having ordinary skill in the art.

The second terminals 20a, 20b may be connected to and/or may be in communication with the first network 18. The second terminals 20a, 20b of the users 26a, 26b, respectively may be in communication with the server 12. As a result, the users 26a, 26b may access the first network 18, the server 12, the first terminal 16 and/or the database 14 via the second terminals 20a, 20b, respectively. The second terminals 20a, 20b may be local or may be remote with respect to the server 12, the second database 14 and/or the first terminal 16. The terminal second 20a may be local or may be remote from the second terminal 20b.

The second terminals 20a, 20b may access, may receive and/or may display the EPG from the first terminal 16 via the first network 18 and/or the server 12. The users 26a, 26b may browse, may view and/or may identify the EPG, the multimedia, the digital media files and/or the metadata stored in the database 14 with the GUI of the first terminal 16. The users 26a, 26b may select and/or may access the EPG, the multimedia, the digital media files and/or the metadata stored in the database 14 via the GUI of the first terminal 16 and/or the second terminals 20a, 20b, respectively. The second terminals 20a, 20b may access, may receive and/or may consume the EPG, the multimedia, the digital media files and/or the metadata stored in the database 14 via the GUI of the first terminal 16. The users 26a, 26b may access, may display, may view and/or may receive the EPG, the multimedia, the digital media files and/or the metadata via the second terminals 20a, 20b, respectively. The users 26a, 26b may store and/or may access the multimedia, the digital media files and/or the metadata received from the first terminal 16 in the second terminals 20a, 20b, respectively.

The second terminal 20a and/or the second terminal 20b may be a mobile device and/or portable device, such as, for example, a 3G mobile device, a 4G mobile device, a wireless broadband device, an internet protocol device, a video cellular telephone, a PDA, a laptop computer, mobile cellular telephone, a satellite radio receiver, a digital television receiver, a portable digital audio player, a portable digital video player and/or the like. The present invention should not be limited to a specific embodiment of the second terminals 20a, 20b. It should be understood that the second terminals 20a, 20b may be any terminal capable of transmitting, capable of receiving, capable of processing and/or capable of displaying the EPG, the multimedia and/or the digital media file as known to one having ordinary skill in the art.

The first network 18 may be a wireless network, such as, for example, a wireless metropolitan area network, a wireless local area network, a satellite network, a wireless personal area network, a global standard network, a wireless broadband network, a personal communication system network, a pager-based service network, a general packet radio service, a universal mobile telephone service network, a radio access network and/or the like. The second terminals 20a, 20b may be remote with respect to and/or may be remotely connected to the server 12 via the first network 18. The server 12 may stream, may transfer and/or may transmit the EPG, the multimedia and/or the digital media file to the second terminals 20a, 20b via the first network 18. The EPG, the multimedia and/or the digital media file may be rendered, may be displayed and/or may be reproduced to the users 26a, 26b via the second terminals 20a, 20b, respectively. The present invention should not be limited to a specific embodiment of the first network 18. It should be understood that the first network 18 may be any wireless network capable of transferring and/or transmitting the EPG, the multimedia and/or digital media files as known to one having ordinary skill in the art.

The terminal 20a may be connected to and/or may be in communication with the terminal 20b via a second data communication network 22 (hereinafter "the second network 22"). The second terminals 20a, 20b may share, may transfer and/or may transmit the EPG, the metadata, the communication and/or information of the multimedia and/or the digital media file via the second network 22. As a result, the EPG, the metadata, the communication and/or the information may be rendered, may be accessed, may be displayed and/or may be reproduced by the users 26a, 26b via the second terminals 20a, 20b, respectively over the second network 22. The EPG, the metadata, the communication and/or the information of the multimedia and/or the digital media file may be stored in the second terminals 20a, 20b. For example, the user 26b may access, may receive and/or may view the EPG, the metadata, the communication and/or the information of the digital media file from the second terminal 20a of the user 26a via the second terminal 20b over the second network 22. The EPG, the metadata, the communication and/or the information may be transmitted, may be shared and/or may be transferred between the second terminals 20a, 20b in an internet protocol. The internet protocol may be data networking protocol, such as, FTP, RTP, RTSP, ASF, SIP, HTTP, IMAP, IRC, NNTP, POP3, SIP, SMTP, SNMP, SSH and/or the like. The present invention should not be limited to a specific internet protocol. It should be understood that the metadata, the communication and/or the information may be shared and/or may be transferred between any number of the users 26 and/or any number of the second terminals 20a, 20b as known to one of ordinary skill in the art.

The second network 22 may be a wireless network, such as, for example, a wireless metropolitan area network, a wireless local area network, a satellite network, a wireless personal area network, a global standard network, a wireless broadband network, a personal communication system network, a pager-based service network, a general packet radio service, a universal mobile telephone service network, a radio access network and/or the like. The second terminal 20a may be remote with respect to and/or may be remotely connected to the second terminal 20b via the second network 22. The present invention should not be limited to a specific embodiment of the second network 22. It should be understood that the second network 22 may be any wireless network capable of transferring and/or transmitting the EPG, the multimedia and/or digital media files as known to one having ordinary skill in the art.

A locating device 24 may be connected to and/or in communication with the server 12 and/or the first terminal 16 via the first network 18. The locating device 24 may be remote with respect to the second terminals 20a, 20b, the server 12 and/or the first terminal 16. The locating device 24 may determine and/or may identify a first location of the second terminal 20a and/or the second terminal 20b with respect to the first terminal 16. The locating device 24 may be a positioning system, such as, for example, a global positioning system, a geocoding system, a communications tower positioning system, a local area network positioning system, a mesh network or peer-to-peer positioning system, a motion sensor or pedometer, and/or the like. The present invention should not be limited to a specific embodiment of the locating device 24. It should be understood that the locating device 24 may be any locating device capable of identifying and/or of determining the first location of the second terminals 20a, 20b.

The locating device 24 may transmit, may send and/or may transfer the first location of the second terminal 20a and/or of the second terminal 20b to the server 12 and/or the first terminal 16 via the first network 18. The locating device 24 may continuously or may periodically identify and/or determine the first location of the second terminals 20a, 20b. The second terminal 20a and/or the second terminal 20b may be moved from the first location to a second location with respect to the first terminal 16. The locating device 24 may determine and/or identify the second location of the second terminal 20a and/or the second terminal 20b. The locating device 24 may transmit and/or may send the second location of the second terminal 20a and/or the second terminal 20b to the server 12 and/or the first terminal 16 via the first network 18. Alternatively, the user 26a and/or the user 26b may enter a zip code, an address and/or other location data corresponding to the first location and/or the second location of the second terminal 20a and/or the second terminal 20b, respectively, into the second terminals 20a, 20b, respectively. The second terminals 20a, 20b may transmit and/or may send the zip code, an address and/or other location data to the server 12 and/or the first terminal 16 via the first network 18 for identification of the first location of the second terminals 20a, 20b, respectively.

Figure 2:
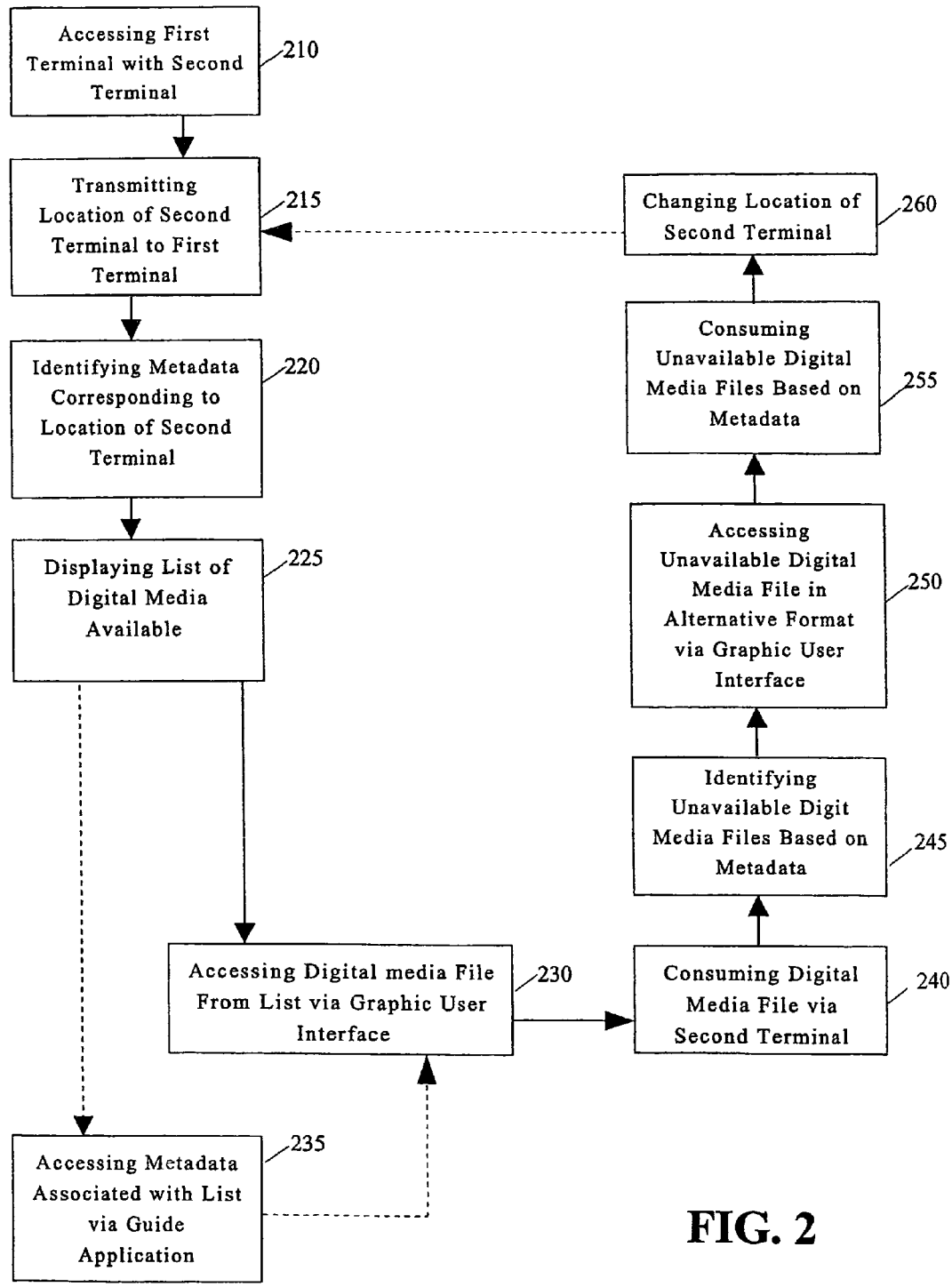
FIG. 2 illustrates a flowchart of a method for accessing EPG information and media content from multiple locations using mobile devices in an embodiment of the present invention.

A method for identifying and/or for accessing the EPG, the multimedia and/or the digital media files via the second terminal 20a, 20b as illustrated in FIG. 2. The second terminal 20a may access and/or may connect to the first terminal 16 via the first network 18 and/or the server 12 as shown at step 210. A location of the second terminal 20a may be transmitted from the locating device 24 and/or the second terminal 20a as shown at step 215. The first terminal 16 may identify the location the second server 20a to determine which digital media files stored in the database 14 may be available for consumption by the second server 20a in the location. The first server 16 may access the availability information of the metadata of the digital media files to determine availability of the digital media files for consumption in the location of the second terminal 20a.

The first server 16 may identify metadata and/or availability information which may correspond to the location of the second terminal 20a as shown at step 220. The first server 16 may display an EPG having a list of digital media files which may be available for consumption by the second terminal 20a based on the metadata of the digital media files and/or the location of the second terminal 20a as shown at step 225. The EPG containing a list of digital media files may be accessed by the second terminal 20a via the guide application of the first terminal 16, the network 18 and/or the server 12. As a result, the user 26a may view the EPG containing a list of digital media files with the second terminal 20a via the guide application. The user 26a may select a digital media file from the list for consumption via the GUI of the EPG.

The second terminal 20a may access the digital media file from the database 14 via the network 18, the server 12 and/or the first terminal 16 as shown at step 230. Alternatively, the user 26a may view the EPG information, the metadata, the communication and/or the information associated with one or more digital media files in the list as shown at step 235 prior to accessing a digital media file from the list for consumption. The user 26a may access the EPG, the metadata, the communication and/or the information from the database 14 via the GUI of the EPG information as shown at step 235. As a result, the metadata of one or more digital media files may be displayed by the second terminal 20a. The digital media file may be transmitted to, may be transferred to and/or may be received by the second terminal 20a via the server 12 and/or the network 18. The second terminal 20a may consume and/or may display the digital media file as shown at step 240.

For example, the second terminal 20a may be located in State A which may be transmitted to the first terminal 16 via the first network 18 and/or the locating device 24. The first terminal 16 may access the metadata of the digital media files stored in the database 14 to determine which digital media files may be transmitted to and/or may be consumed by the second terminal 20a in State A. The first terminal 16 may determine, for example, that two thousand digital media files may be available for transmission and/or for consumption by the second terminal 20a in State A. The second terminal 20a may then access and/or may display a list of the two thousand digital media files to the user 26a via the EPG of the first terminal 16. The user 26a may use the EPG to view metadata associated with one or more of the two thousand digital files from the list. The user 26a may access one or more of the two thousand digital files from the database via the GUI of the EPG. As a result, the user 26a may consume and/or may view one or more of the two thousand digital files with the second terminal 20a via the server 12 and/or the first network 18.

The digital media file may be special programming, such as, for example, local programming, regional programming and/or the like. The special programming may be associated news, weather, sports, music, public service, public safety, advertising and/or the like which may be local to and/or regional to the origin of the special programming. The metadata associated with the special programming may have limitations for restricting consumption of the special programming to a location associated with the local programming and/or the regional programming. For example, the special programming may be associated with a concert in City X and may include advertising from restaurants and hotels in City X which may surround the concert site. The metadata associated with the special programming may restrict consumption of the special programming to a location within the boundaries of City X. The user 26a and/or the second terminal 16 may be in a location within the boundaries of City X. As a result, the user 26a may access and/or may consume the special programming via the second terminal 16 and/or the GUI of the EPG. Alternatively, the user 26a and/or the second terminal 20a may be in a location outside of the boundaries of City X. As a result, the special programming may be unavailable to the user 26a for consumption via the second terminal 20a.

One or more digital media files from the list may be unavailable for consumption in the location of the second terminal 20a. The limitations defined within the metadata of digital media files may restrict and/or may prevent consumption of one or more digital media files based on, for example, a public law or regulation, an advertising agreement, a content licensing agreement and/or a content distribution restriction. The first terminal 16 may determine unavailable digital media files which may be restricted from consumption in the location of the second terminal 20a. The first terminal 16 may identify unavailable digital files in the list as shown at step 245. The unavailable digital media files may be based on and/or may correspond to the limitations and/or the metadata of the digital media files from the list. The limitation for the unavailable digital media file may restrict consumption of the file in a restricted format, such as, for example, a video format or an audio format. The user may view the unavailable digital media files with the second terminal 20a via the EPG. The EPG may identify each unavailable digital media file in the list with an indicator, such as, for example, an icon, an animation, a location on a screen, a size, a color, a sound, text, a phrase, a symbol and/or the like. As a result, the user 26a may determine each unavailable digital media file via the indicator in the EPG which may be viewed with the second terminal 20a. The present invention should not be limited to a specific embodiment of the indicator of the unavailable digital media file.

The unavailable digital media files may be available in an second format for consumption in the location of the second terminal. The second format may be, for example, an audio format, an abridged audio format, an abridge video format, an edit audio or edit video format, a textual summary format and/or a graphical summary format and/or the like. The second terminal 20*a* may access an unavailable media file in the alternative format from the database 14 via the GUI of the EPG as shown at step 250. The second terminal 20*a* may consume and/or may display the otherwise unavailable media file in the second format via the first terminal 16, the server 14 and/or the first network 18 as shown at step 255. As a result, the user 26*a* may view the unavailable digital media file in the second format via the second terminal 20*a*.

The user 26*a* may change and/or may move the location of the second terminal 20*a* with respect to the first terminal 16 as shown at step 260. The second terminal 20*a* may move from the first location to the second location. In the second location, the first terminal 16 may locate the second terminal 20*a* and/or may receive a location of the second terminal 20*a* which may be transmitted to the first terminal 16 as shown at step 215. The first terminal 16 may display the list of digital media files available in the second location for consumption by the second terminal 20*a* based on the second location of the second terminal 20*a* as shown at step 225. The user 26*a* may access and/or may consume the available digital media files via the GUI of the EPG and/or the first terminal 16 as shown at the step 230 and/or the step 235. Moreover, the user 26*a* may access and/or may consume the unavailable digital media file based on the new location of the second terminal 20*a* via the GUI of the EPG and/or the first terminal 16 as shown at the step 250 and/or the step 255. The present invention should not be limited to a specific embodiment of a number of times which the user 26*a* may change and/or move the location of the second terminal 20*a*.

For example, a televised sporting event in State A may be restricted from consumption and/or from distribution of a digital video file of the televised sporting event in State A for a duration of time, such as, three days. The digital video file associated with the televised sporting event may have metadata with limitations restricting consumption of the digital video file in State A by the user 26*a*. As a result, the digital video file may be unavailable for consumption in State A by the user 26*a* until expiration of the duration of time. The EPG for the second terminal 20*a* may identify that the digital video file may be unavailable for consumption in State A with text "live stadium event", "blacked out," "not available" and/or the like. However, the EPG for the second terminal 20*a* may identify an alternative format, such as, for example, a digital audio file in which the sporting event may be available for consumption in State A by the second terminal 20*a*. Further, the EPG for second terminal 20*a* may identify that the digital audio file of the televised sporting event may be available for consumption in State A by the second terminal 20*a*. The user 26*a* may select the digital audio file for consumption by the second terminal 20*a* via the EPG and proceed to consume the multimedia content.

The user 26*a* may transmit a zip code to the first terminal 16 via the second terminal 20*a*, the first network 18 and/or the server 12. The zip code may correspond to a current location or a future location of the second terminal 20*a*. The first terminal 16 may identify and/or may display an EPG having a list of digital media files which may be available for consumption by the second terminal 20*a* in the current location at a future moment of time. Further, the first terminal 16 may identify and/or may display an EPG having a list of digital media files which may be available for consumption by the second terminal 20*a* in the future location at a future moment of time. As a result, the user 26*a* may identify and/or may consume the digital media file in the present location and/or in the future location at a future moment of time.

The system 10 and/or the method 200 may have the first terminal 16 and/or the second terminals 20*a*, 20*b* for identifying and/or consuming the digital media files stored in the database 14. The first terminal 16 may identify and/or may display the EPG having the list of the digital media files which may be available for consumption by the second terminal 20*a* and/or the second terminal 20*b*. The EGP having the list of the digital media files may correspond to and/or may be based on the location of the second terminal 20*a* and/or the second terminal 20*b*.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for accessing media content, the system comprising:
    digital media encoded by digital media files wherein a first digital media file has first metadata corresponding to a first location wherein a second digital media file has second metadata corresponding to a second location wherein the second location is remote with respect to the first location;
    a server storing the digital media wherein the server transmits a first list of digital media and a second list of digital media wherein the first list of digital media indicates that the first digital media file is accessible at the first location wherein the second list of digital media indicates that the second digital media file is accessible at the second location;
    a first terminal electrically connected to the server via a communication network wherein the first terminal accesses and communicates with the server via the communication network wherein the first terminal is movable between the first location and the second location;
    a locating device electrically connected to the server wherein the server determines whether the first terminal is positioned at the first location or the second location via the locating device wherein the server transmits the first list of digital media to the first terminal which is located at the first location wherein the server transmits the second list of digital media to the first terminal which is located at the second location; and
    an electronic program guide accessible from the server by the first terminal wherein the first terminal which is located at the first location uses the electronic program guide to display the first list wherein the first terminal which is located at the second location uses the electronic program guide to display the second list and further wherein the first terminal which is located at the second location uses the electronic program guide to indicate that the first digital media file is not available in the second location.

2. The system of claim 1 wherein the communication network is a wireless network.

3. The system of claim 1 further comprising:
    location information transmitted from the locating device to the server wherein the server uses the location information to determine whether the first terminal is positioned at the first location or the second location and further wherein the location information is generated and transmitted without user input on the first terminal indicating whether the first terminal is positioned at the first location or the second location.

4. The system of claim 1 wherein the locating device is physically attached to the mobile device.

5. The system of claim 1 wherein the first terminal which is located at the second location uses the electronic program guide to indicate that the first digital media file is available in the first location.

6. The system of claim 1 wherein the first terminal which is located at the second location uses the electronic program guide to indicate a future time when the first digital media file will be available in the second location.

7. The system of claim 1 wherein the first terminal which is located at the second location uses the electronic program guide to indicate an alternate format in which the first digital media file is available in the second location.

8. The system of claim 1 wherein the first terminal which is located at the second location uses the electronic program guide to indicate an alternate content source wherein the first digital media file is available from the alternate content source for the first terminal which is located at the second location.

9. The system of claim 1 wherein the first terminal in the first location accesses the first digital media file from the server via the first list of digital media wherein the first terminal in the second location accesses the second digital media file from the server via the second list of digital media.

10. A method for accessing electronic program guide information and media content from multiple locations using a terminal having a database which stores a first digital media file encoded in a first format and a second format which is a different format than the first format and further wherein the first digital media file encoded in the first format has first metadata corresponding to a first location wherein the first digital media file encoded in the second format has second metadata corresponding to a second location which is a different location than the first location and further wherein the first digital media file encodes multimedia content, the method comprising the steps of:
positioning a mobile device which is a different device than the terminal at a third location wherein a communication network connects the mobile device to the terminal;
transmitting location information from the mobile device to the terminal wherein the location information identifies the third location wherein the terminal compares the third location to the first location and the second location;
displaying a list of available media on the mobile device in response to comparison of the third location to the first location and the second location wherein the list identifies the first digital media file encoded in the first format as accessible by the mobile device in the third location if the third location corresponds to the first location and further wherein the list identifies the first digital media file encoded in the second format as accessible by the mobile device in the third location if the third location corresponds to the second location; and
receiving the first digital media file if a user of the mobile device selects the first digital media file from the list using user input on the mobile device wherein the mobile device receives the first digital media file from the database if the user of the mobile device selects the first digital media file from the list and further wherein the first digital file received by the mobile device is encoded in the first format if the third location corresponds to the first location and further wherein the first digital file received by the mobile device is encoded in the second format if the third location corresponds to the second location.

11. The method of claim 10 further comprising the step of: accepting user input on the mobile device wherein the mobile device transmits the location information to the first terminal via the communication network and further wherein the location information is based on the user input.

12. The method of claim 10 further comprising the step of: displaying an electronic program guide on the mobile device wherein the list of the available media and permitted times of the available media are identified and the first media file is selected using the electronic program guide.

13. The method of claim 10 wherein the location information is generated and transmitted without user input on the mobile device indicating the third location.

14. The method of claim 10 wherein the first format of the first digital media file is an audiovisual format and further wherein the second format of the first digital media file is an audio format which does not include video.

15. The method of claim 10 further comprising the step of: displaying media content encoded by the first digital media file on the mobile device after receiving the first digital media file from the database.

16. The method of claim 10 further comprising the step of: switching from transmitting the first digital media file encoded in the first format to transmitting the first digital media file encoded in the second format if the mobile device moves from the first location to the second location without user input on the mobile device requesting a switch.

17. A method for accessing electronic program guide information, first available digital media and second available digital media from multiple locations using a terminal connected to a database wherein the database stores the first available digital media and the second available digital media and further wherein the first available digital media has first metadata which identifies a first location and the second available digital media has second metadata which identifies a second location, the method comprising the steps of:
transmitting location information of a mobile device which is a different device than the terminal to the terminal wherein the mobile device is electrically connected to the terminal using a communication network wherein the mobile device accesses and communicates with the terminal using the communication network;
determining that the mobile device is located within the first location using the location information wherein the terminal identifies that the first available digital media corresponds to the first location using the first metadata of the first available digital media;
displaying a first electronic program guide on the mobile device wherein the first electronic program guide is transmitted from the terminal to the mobile device using the communication network wherein the first electronic program guide identifies the first available digital media which is consumable by the mobile device located within the first location;
identifying the second available digital media wherein the mobile device uses the electronic program guide to identify the second available digital media and further wherein the mobile device uses the electronic program guide to indicate that the second available digital media is unavailable in a first format in the first location wherein the mobile device uses the electronic program guide to indicate that the second available digital media is available in a second format in the first location; and transmitting a first digital media file from the database to the mobile device using the communication network wherein the first digital media file is selected from the first available digital media using the first electronic program guide and user input on the mobile device.

18. The method of claim 17 further comprising the step of: displaying media content encoded by the first digital media file on the mobile device after receipt of the first digital media file by the mobile device.

19. The method of claim 17 wherein the second available digital media in the second format provides an abridged version of media content encoded by the second available digital media in the first format.

20. The method of claim 17 further comprising the step of: positioning the mobile device within the second location wherein the second available digital media is accessible by the mobile device in the second location wherein a second digital media file of the second available digital media is transmitted to the mobile device in response to selection of the second digital media file by user input on the mobile device and further wherein the second digital media file is in the first format.

21. The method of claim 17 further comprising the step of: transmitting a second electronic program guide from the terminal to the mobile device using the communication network if the mobile device moves from the first location to the second location wherein the second electronic program guide identifies the second available digital media and further wherein the second electronic program guide indicates that the second available digital media is available in the first format.

22. A method for accessing electronic program guide information and media content from multiple locations using terminal having a database which stores a first digital media file encoded in a first format and a second format which is a different format than the first format and further wherein the first digital media file encoded in the first format has first metadata corresponding to a first location wherein the first digital media file encoded in the second format has second metadata corresponding to a second location which is a different location than the first location and further wherein the first digital media file encodes multimedia content, the method comprising the steps of:

positioning a mobile device which is a different device than the terminal at a third location wherein a communication network connects the mobile device to the terminal;

transmitting location information from the mobile device to the terminal wherein the location information identifies the third location wherein the terminal compares the third location to the first location and the second location;

displaying a list of available media on the mobile device in response to comparison of the third location to the first location and the second location wherein the list identifies the first digital media file encoded in the first format as accessible by the mobile device in the third location if the third location corresponds to the first location and further wherein the list identifies the first digital media file encoded in the second format as accessible by the mobile device in the third location if the third location corresponds to the second location;

receiving the first digital media file if a user of the mobile device selects the first digital media file from the list using user input on the mobile device wherein the mobile device receives the first digital media file from the database if the user of the mobile device selects the first digital media file from the list and further wherein the first digital file received by the mobile device is encoded in the first format if the third location corresponds to the first location and further wherein the first digital file received by the mobile device is encoded in the second format if the third location corresponds to the second location; and indicating availability of a second digital media file having the second metadata corresponding to the second location wherein the second digital media file encodes different multimedia content than the first digital media file and further wherein the mobile device uses the list to indicate that the second digital media file is unavailable if the third location corresponds to the first location wherein the mobile device uses the list to indicate that the second digital media file is available if the third location corresponds to the second location.

23. The method of claim 22 further comprising the step of: accepting user input on the mobile device wherein the mobile device transmits the location information to the first terminal via the communication network and further wherein the location information is based on the user input.

24. The method of claim 22 further comprising the step of: displaying an electronic program guide on the mobile device wherein the list of available media is identified and the first digital media file is selected using the electronic program guide.

25. The method of claim 22 wherein the location information is generated and transmitted without user input on the mobile device indicating the third location.

26. The method of claim 22 wherein the first format is an audiovisual format and further wherein the second format is an audio format which does not include video.

27. The method of claim 22 further comprising the step of: displaying the media content encoded by the first digital media file on the mobile device after receiving the first digital media file from the database.

28. The method of claim 22 further comprising the step of: switching from transmitting the first digital media file encoded in the first format to transmitting the first digital media file encoded in the second format if the mobile device moves from the first location to the second location.

29. A method for accessing electronic program guide information and media content from multiple locations using a terminal having a database which stores a first digital media file encoded in a first format and a second format which is a different format than the first format and further wherein the first digital media file encoded in the first format has first metadata corresponding to a first location wherein the first digital media file encoded in the second format has second metadata corresponding to a second location which is a different location than the first location and further wherein the first digital media file encodes multimedia content, the method comprising the steps of:

positioning a mobile device which is a different device than the terminal at a third location wherein a communication network connects the mobile device to the terminal;

transmitting location information from the mobile device to the terminal wherein the location information identifies the third location wherein the terminal compares the third location to the first location and the second location;

displaying a list of available media on the mobile device in response to comparison of the third location to the first location and the second location wherein the list identifies the first digital media file encoded in the first format as accessible by the mobile device in the third location if the third location corresponds to the first location and further wherein the list identifies the first digital media file encoded in the second format as accessible by the mobile device in the third location if the third location corresponds to the second location;

indicating that the first digital media file encoded in the first format is not accessible by the mobile device in the second location if the third location corresponds to the second location wherein the mobile device uses the list to indicate that the first digital media file encoded in the first format is not accessible by the mobile device if the third location corresponds to the second location;

identifying that the first digital media file encoded in the second format is an available substitute for the first digital media file encoded in the first format wherein the mobile device uses the list to indicate that the first digital media file encoded in the second format is the available substitute; and receiving the first digital media file if a user of the mobile device selects the first digital media file from the list using user input on the mobile device wherein the mobile device receives the first digital media file from the database if the user of the mobile device selects the first digital media file from the list and further wherein the first digital file received by the mobile device is encoded in the first format if the third location corresponds to the first location and further wherein the first digital file received by the mobile device is encoded in the second format if the third location corresponds to the second location.

30. The method of claim 29 further comprising the step of:
accepting user input on the mobile device wherein the mobile device transmits the location information to the first terminal via the communication network and further wherein the location information is based on the user input.

31. The method of claim 29 further comprising the step of:
displaying an electronic program guide on the mobile device wherein the list of available media is identified and the first digital media file is selected using the electronic program guide.

32. The method of claim 29 wherein the location information is generated and transmitted without user input on the mobile device indicating the third location.

33. The method of claim 29 wherein the first format is an audiovisual format and further wherein the second format is an audio format which does not include video.

34. The method of claim 29 further comprising the step of:
displaying media content encoded by the first digital media file on the mobile device after receiving the first digital media file from the database.

35. The method of claim 29 further comprising the step of:
switching from transmitting the first digital media file encoded in the first format to transmitting the first digital media file encoded in the second format if the mobile device moves from the first location to the second location.

36. A method for accessing electronic program guide information, first available digital media and second available digital media from multiple locations using a terminal connected to a database wherein the database stores the first available digital media and the second available digital media and further wherein the first available digital media has first metadata which identifies a first location and the second available digital media has second metadata which identifies a second location, the method comprising the steps of:

transmitting location information of a mobile device which is a different device than the terminal to the terminal wherein the mobile device is electrically connected to the terminal using a communication network wherein the mobile device accesses and communicates with the terminal using the communication network;

determining that the mobile device is located within the first location using the location information wherein the terminal identifies that the first available digital media corresponds to the first location using the first metadata of the first available digital media;

displaying a first electronic program guide on the mobile device wherein the first electronic program guide is transmitted from the terminal to the mobile device using the communication network wherein the first electronic program guide identifies the first available digital media which is consumable by the mobile device located within the first location;

identifying the second available digital media which is unavailable to the mobile device located within the first location wherein the mobile device uses the first electronic program guide to identify the second available digital media and further wherein the first electronic program guide indicates that the second available digital media is unavailable within the first location; and transmitting a first digital media file from the database to the mobile device using the communication network wherein the first digital media file is selected from the first available digital media using the first electronic program guide and user input on the mobile device.

37. The method of claim 36 further comprising the step of:
displaying media content encoded by the first digital media file on the mobile device after receipt of the first digital media file by the mobile device.

38. The method of claim 36 further comprising the step of:
indicating a future time when the second available digital media will be accessible by the mobile device in the first location wherein the mobile device uses the first electronic program guide to indicate the future time.

39. The method of claim 36 further comprising the step of:
positioning the mobile device within the second location wherein the second available digital media is accessible by the mobile device in the second location and further wherein a second digital media file of the second available digital media is transmitted to the mobile device in response to selection of the second digital media file by user input on the mobile device.

40. The method of claim 36 further comprising the step of:
transmitting a second electronic program guide from the terminal to the mobile device using the communication network if the mobile device moves from the first location to the second location wherein the second electronic program guide indicates that the second available digital media is available to the mobile device in the second location.

* * * * *